July 28, 1959     R. M. NORMAN ET AL     2,896,257
INJECTION MOLDING MACHINE
Filed Nov. 21, 1955     3 Sheets-Sheet 1
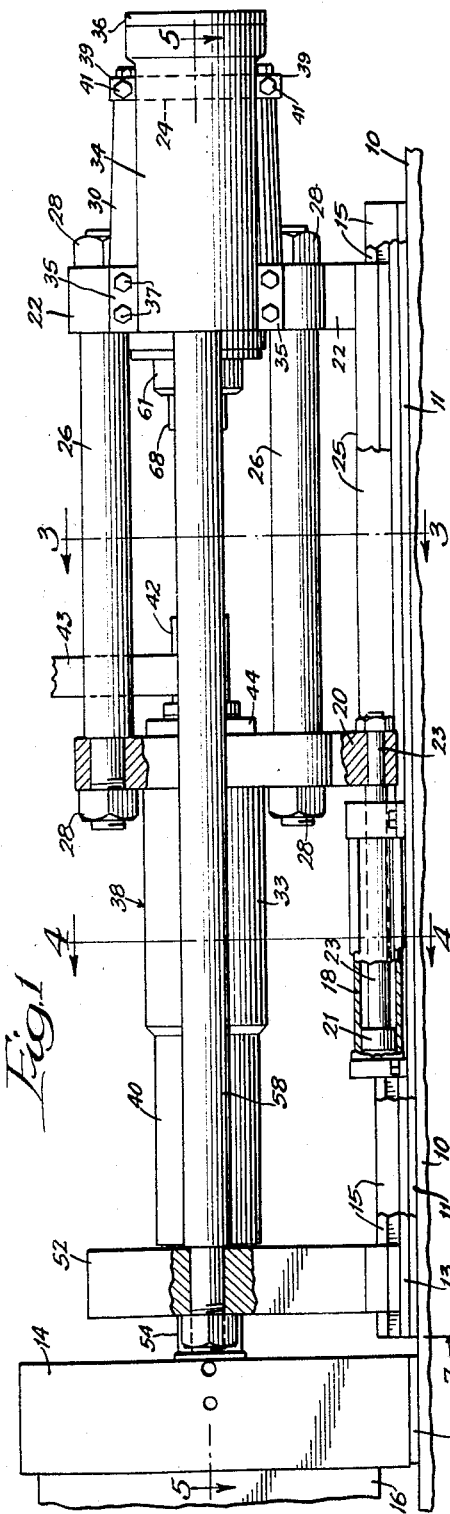
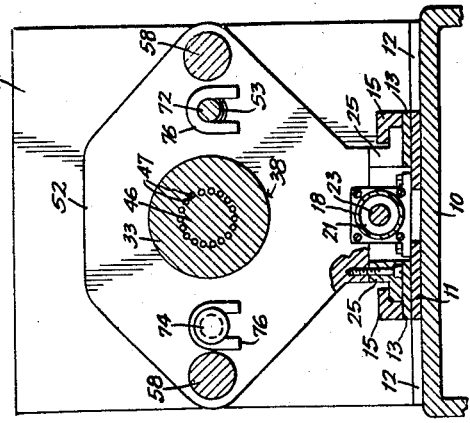
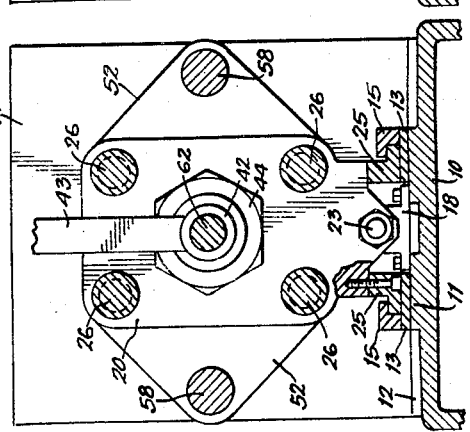
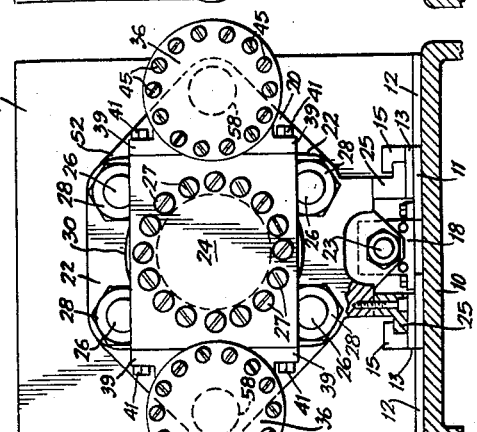
INVENTORS:
Richard M. Norman,
Russell W. Powell and
Kenneth E. Sherer,
BY
Bair, Freeman & Molinare
ATTORNEYS.

July 28, 1959 R. M. NORMAN ET AL 2,896,257
INJECTION MOLDING MACHINE
Filed Nov. 21, 1955 3 Sheets-Sheet 2

INVENTORS:
Richard M. Norman,
Russell W. Powell and
Kenneth E. Scherer,
BY
Bair, Freeman & Molinare
ATTORNEYS.

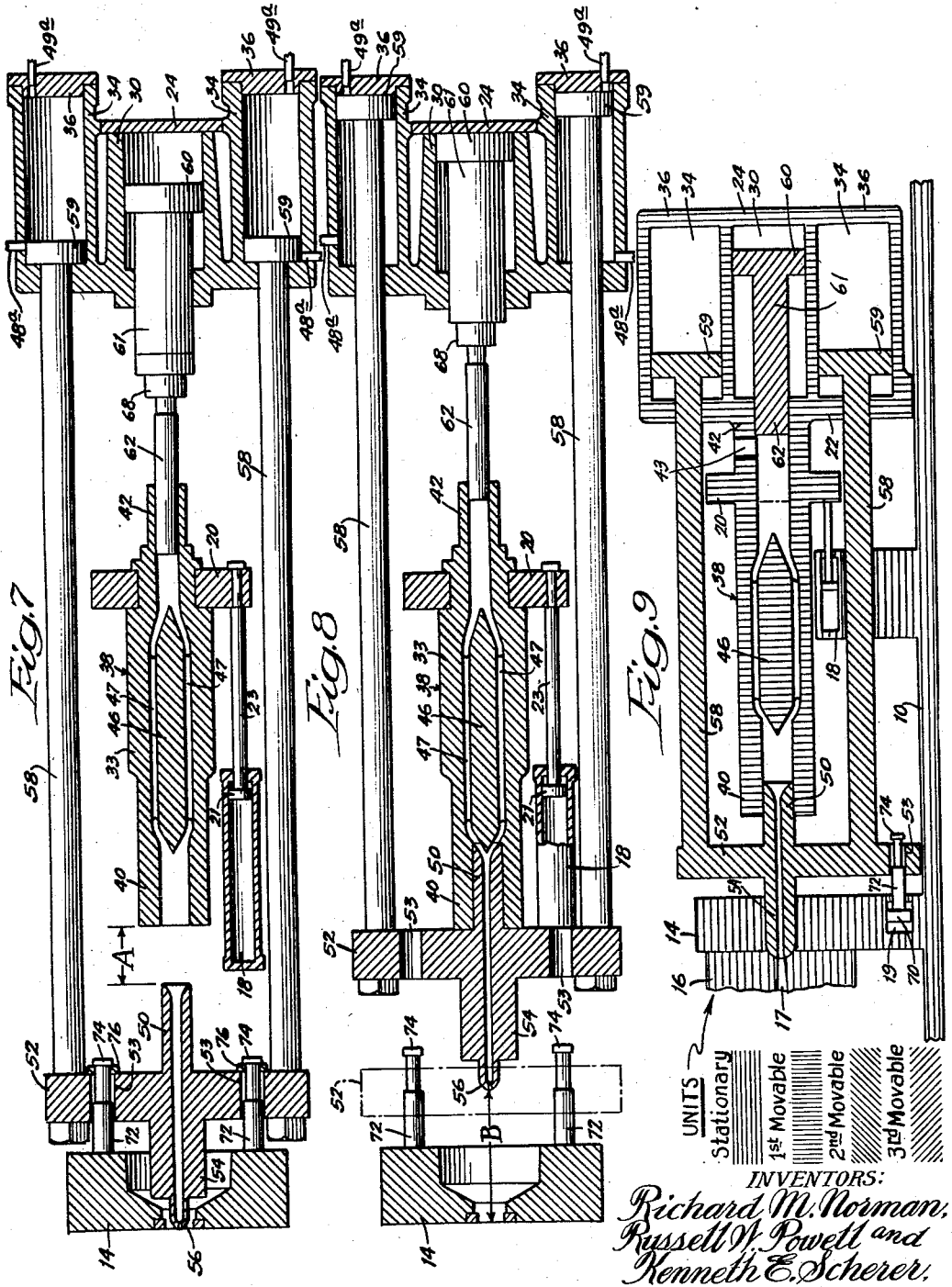

United States Patent Office 2,896,257
Patented July 28, 1959

2,896,257

INJECTION MOLDING MACHINE

Richard M. Norman, Russell W. Powell, and Kenneth E. Sherer, Richmond, Ind., assignors to National Automatic Tool Company, Inc., Richmond, Ind., a corporation of Indiana Application November 21, 1955, Serial No. 548,104

10 Claims. (Cl. 18—30)

This invention relates to an injection molding machine of the straight-line type having therein a mechanical premelter means for thermo-plastic molding materials and the like.

One object of our invention is to provide a molding machine which has a single chamber for feeding, premelting and injecting, in which the feeding is accomplished by partial, single or multiple feed strokes, the construction eliminating restriction to a single feed stroke as in prior devices or the need for two chambers, one for premelting the material and the other for storing and injecting the melted material. By using multiple feed strokes the efficiency of the single chamber to melt material can be increased and a more constant temperature of the molding material can be maintained, a condition which results in easier filling of the molds and better physical specifications in the molded article. Our disclosed construction eliminates the need for rotary, slide or check valves, or a plunger cut-off for controlling material flow in or between the premelting and injection chambers of prior devices.

Another object is to permit the feeding and injection of molding material into and from a single chamber in which the molding material is heated so that we eliminate the hazard of air being introduced into the injection section of the chamber which would cause burning or discoloration of the molding material during injection.

Still another object is to provide a molding machine in which, by limiting the length of the chamber movement during either the feeding or injecting phases of the machine cycle, we are able to provide an accurate measurement of the amount of molding material injected into the mold.

A further object is to provide a machine which uses a standard conventional molding machine injection plunger with its hydraulic cylinder and ram assembly as the material feeding unit for a premelting section of the machine, which plunger when oil is entrapped in its hydraulic cylinder, provides the necessary resistance to keep the melted molding material from re-entering the feed unit during injection of melted material into the mold.

Still a further object is to provide a molding machine which permits the injection section of the chamber and the injection plunger to be hydraulically separated to allow access to the front end of the injection and heating sections of the chamber and to the rear end of a nozzle extension which forms the injection plunger. This permits access for complete and thorough cleaning of molding material or foreign matter from the injection chamber. The separation of the heating chamber from the nozzle extension is accomplished without the use of screws, bolts, studs, clamps or mechanical locks.

An additional object is to provide a molding machine so constructed that purging of the chamber is permitted with a minimum amount of molding material being wasted. With the nozzle extension unlocked from the stationary die head, the premelting chamber and nozzle extension can be retracted as a unit from the die head for the purging operation. The nozzle extension is hydraulically sealed to the chamber so that no screws, bolts, studs, clamps or mechanical locks are used. The use of a single chamber with a nozzle extension entering it and terminating closely adjacent the melting section of the chamber reduces the volume of melted molding material in the injection chamber to an absolute minimum. In this position, material can be purged direct from the premelting section of the chamber through the nozzle extension which also serves as an injection plunger, and the nozzle itself by operation of the feed plunger.

Another additional object is to provide a molding machine so constructed that a single chamber serves at one end as a feed cylinder and at the other end as an injection cylinder, premelting means being provided between the two cylinders and the feeding operation involving the introduction of material into the feeding end of the chamber by the reciprocation of a feed plunger in the feed cylinder, thus causing movement of the material past the preheating means into the injection cylinder which propels the entire chamber rearwardly with respect to the injection plunger extending into the injection cylinder, such propulsion being resisted hydraulically. After the completion of the feeding operation, the injection operation is performed by then moving the single chamber forwardly over the injection plunger for expelling the melted material therefrom through the plunger itself and finally from the injection nozzle which is in communication with the mold, the feed plunger at that time serving to take the back pressure produced by the injection operation.

It is also an object of our invention to provide a single chamber having a preheating zone located intermediate a feed cylinder defined at one end and an injection cylinder defined at the other end of the chamber, and novel propelling means for feed and injection plungers in the cylinders which involves an arrangement of three separate movable units on a stationary base unit.

With these and other objects in view, our invention consists in the construction, arrangement and combination of the various parts of our injection molding machine, whereby the objects above contemplated are attained, as hereinafter more fully set forth, pointed out in our claims and illustrated in detail on the accompanying drawing, wherein:

Fig. 1 is a side elevation of a molding machine embodying our present invention, portions thereof being broken away and other portions being shown in section to illustrate details of construction and structural relationships;

Fig. 2 is a rear end elevation of the molding machine, the right hand end of Fig. 1 being considered the rear end;

Fig. 3 is a vertical sectional view on the line 3—3 of Fig. 1;

Fig. 4 is a vertical sectional view on the line 4—4 of Fig. 1;

Fig. 7 is a similar diagrammatic view showing the parts in the position they assume when a "separating" operation for inspection and cleaning purposes has been completed;

Fig. 8 is a similar diagrammatic view showing the position of the parts during a "purging" operation; and Fig. 9 is another form of diagram showing particularly the relationship between stationary and movable units of our molding machine.

Figure 5:
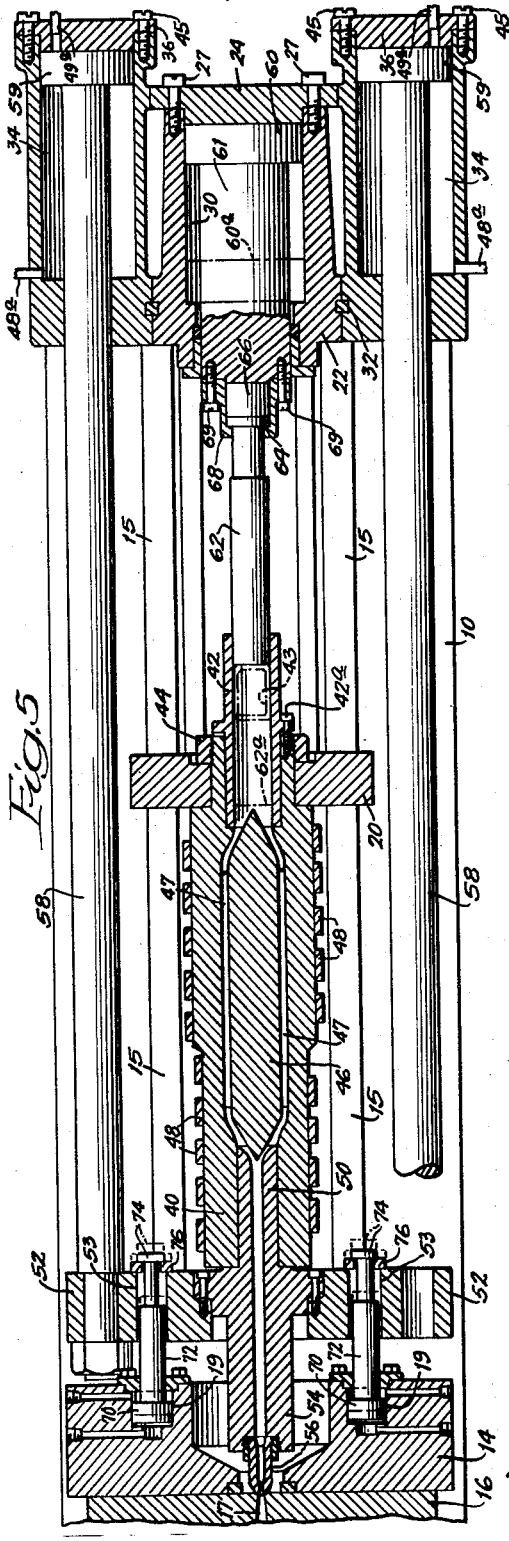
Fig. 5 is a horizontal sectional view on the line 5—5 of Fig. 1 showing the parts in the injecting position.

A molding machine of the design which we herein disclose has a number of separate units when considered from the standpoint of those units which move in relation to a stationary unit. The units are shaded distinctively in Fig. 9. In describing the parts of the machine, we will refer to these units under specific headings.

Stationary unit (Reference numerals of 10 series—horizontal shading in Fig. 9)

This unit consists in general of a base 10 and a stationary head 14 secured thereto on a finished pad 12 of the base (see Fig. 1). A stationary mold half 16 is illustrated as secured to the head 14 and having a sprue opening 17 to receive the plastic material molded by the molding machine. The other half of the mold is not illustrated, molds of this character being conventional. A separating and purging operation cylinder 18 is secured to the base 10 and the head 14 is provided with a pair of hydraulic lock cylinders 19.

First movable unit (Reference numerals of 20, 30 and 40 series—vertical shading in Fig. 9)

This unit is slidable along the base 10 and comprises a front head 20 and an intermediate head 22 connected together by tie rods 26 (see Fig. 1), nuts 28 being shown on the ends thereof for this purpose. A feed operation cylinder 30 forms a rearward extension of the head 22 and a plate-like cylinder head 24 is secured to the cylinder 30 by cap screws 27. Referring to Fig. 5, it will be noted the cylinder 30 is keyed at 32 to a pair of injection operation cylinders 34 which are provided at their rear ends with cylinder heads 36 secured in position by cap screws 45.

The front head 20 carries a separating and purging operation piston rod 23 on which is a separating and purging operation piston 21 in the cylinder 18.

A feeding, premelting and injection chamber 38 is provided which is secured to the front head 20 as by a lock nut 44, and at its forward end is somewhat reduced in diameter to form an injection cylinder 40. Extending into the rear or right hand end of the premelting chamber 38 is a feed cylinder 42 held in position by cap screws 42a.

The central section of the chamber 38 constitutes a premelting section 33, and a spreader or "torpedo" 46 is located therein and is formed by a circular series of holes 47 as shown in Fig. 4. The elements 33, 40 and 42 thus constitute a single chamber with feeding, premelting and injection sections. The "torpedo" 46 is formed by drilling a series of holes 47 through the premelting section 33 and the chamber 38 may, for convenience of drilling and fabrication, be formed in several parts welded together rather than one solid piece as illustrated in Fig. 5.

Second movable unit (Reference numerals of 50 series—shading inclined upwardly toward right in Fig. 9)

This unit comprises an injection plunger 50, supported by a nozzle supporting head 52 which is also slidable on the base 10 and the injection plunger has a forward extension 54. An injection nozzle 56 (see Fig. 5) is mounted therein for coaction with the sprue opening 17, the nozzle being seated in the entrance to the sprue opening by hydraulic pressure as will hereinafter appear. The element 50 may be considered as an extension of the nozzle 56. The nozzle supporting head 52 has a pair of openings 53 therein and piston rods 58 have their forward ends connected to the head 52 and on their rear ends the rods have injection operation pistons 59 within the cylinders 34.

Third movable unit (Reference numerals of 60 series—shading inclined downwardly toward right in Fig. 9)

This unit consists of a feed operation piston 60 slidable within the cylinder 30 and having connected to the forward end of its piston rod 61 a feed plunger 62 slidable in the feed cylinder 42. The assembly 60—62 is carried by the first movable unit and in turn is movable relative to it. This is best shown in the diagram of Fig. 9 which also shows the stationary and the first and second movable units and their relation to each other.

Hydraulic lock unit (Reference numerals of 70 series)

Hydraulic lock pistons 70 are slidable in the hydraulic lock cylinders 19 and each has a piston rod 72 passing through one of the openings 53 of the head 52 and terminating in a piston rod head 74. A pair of U-bars 76 are adapted to remain positioned as in Fig. 4 or can be removed for a purpose which will hereinafter appear, the U-bars serving to lock the piston rods 72 to the nozzle supporting head 52 for drawing the nozzle 56 into engagement with the stationary mold 16.

Having described in general the stationary unit and the three movable units above referred to under the headings therefor, we will now fill in the necessary details for showing constructional features and cooperation of the parts. Spacers 11 and ways 13 extend longitudinally of the base 10 (see Figs. 1 and 2) and stationary gibs 15 are mounted thereon.

The first movable unit (20—49) is slidable relative to the gibs 15 by mounting the heads 20 and 22 on feet 25 which extend from 20 to 22 and are slidable in the gibs 15. The injection operation cylinders 34 have feet 35 (see Fig. 1) at their forward ends secured by cap screws 37 to the sides of the intermediate head 22, and the cylinders 34 adjacent their rear ends have feet 39 secured by cap screws 41 to the sides of the cylinder head 24. The head 24 thus serves as a connection between the rear ends of the cylinders 34 while at the same time it serves as a head for the cylinder 30.

A feed sleeve 43 extends from a suitable source of pelletized plastic molding material to the feed cylinder 42 and in accordance with the usual practice measured quantities of the material are supplied each cycle of operation through the sleeve to the cylinder.

The premelting section 33 and the injection cylinder 40 of the chamber 38 are heated by electric heating elements 48 suitably controlled in the usual manner to premelt the plastic material and thus condition it for injection into the mold.

The third movable unit (60—69) is shown best perhaps in Fig. 5 and it will be noted that the feed plunger 62 has a head 64 retained against a spacer 66 by a retainer ring 68. The retainer ring is in turn secured to the feed operation piston rod 61 by cap screws 69.

Normal molding operations

Fig. 5 illustrates the parts of our molding machine in the position they assume at the end of an injection operation when the piston 60 and the plunger 62 would be in the forward dot-and-dash line position indicated 60a and 62a respectively. While the parts are in this position, a measured amount of granular or pelletized (unmelted) plastic material is fed into the feed sleeve 43 to fall into the feed cylinder 42 on top of the feed plunger 62. The majority of the material fed is retained in a chute above the feed sleeve. The feed operation piston 60 when returned to its rearward position permits the molding material to fall in front of the feed plunger 62.

Hydraulic means is provided for pumping oil selectively to opposite ends in the cylinder 30 to reciprocate the piston 60 but since this is conventional, we have not attempted to show it on our drawings. The same is true with respect to the cylinders 18 and 19. Various hydraulic circuit arrangements can be used for controlling the pistons in these cylinders but form no part of our present invention. For control of the pistons 59 in the cylinders 34, we prefer to provide for the introduction of oil under pressure from a pipe 48a to drive the cylinders forwardly with respect to the pistons or to drive the pistons rearwardly with respect to the cylinders, the heads 36 being freely open through piping 49a to an oil tank 47a to take care of the displacement in the cylinders back of the pistons. During those phases of operation when oil is displaced from the cylinders in front of the pistons it returns to the tank 47a through a pressure relief valve 49 to provide a desired back pressure as will be described.

Figure 6:
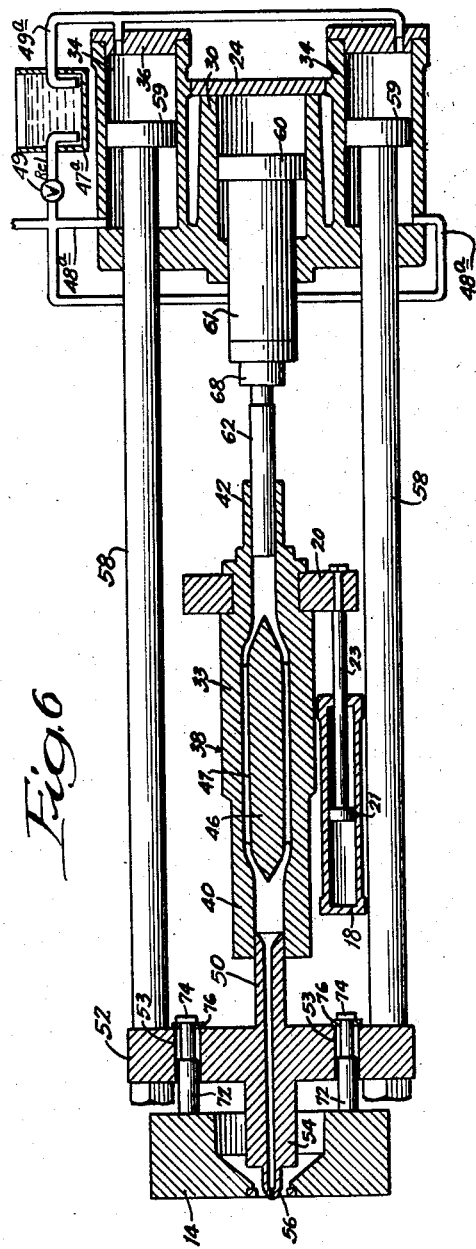
Fig. 6 is a semi-diagrammatic view similar to Fig. 5 showing the parts in the position they assume when the injection chamber is filled and just prior to the injection operation.

When the piston 60 moves forwardly, the granular material is forced by the plunger 62 reciprocating in the cylinder 42 into the premelting section 33 surrounding the torpedo 46 and is further displaced into the injection cylinder 40, thereby tending to enlarge it. Such enlargement, of course, can only be effected by movement of the cylinder 40 rearwardly over the injection plunger 50. Such movement takes place, the parts moving from the position shown in Fig. 5 to the position shown in Fig. 6.

Such movement carries all of the elements numbered 20 to 49 (first movable unit) and 60 to 69 (third movable unit) rearwardly and since the cylinders 34 are moving rearwardly with respect to the pistons 59, they effect expulsion of oil from in front of the pistons through the pressure relief valve 49 which valve is adjustable so as to determine the opening pressure thereof and accordingly the pressure imposed on the premelted material in the injection cylinder 40. Thus we provide a resistance force which maintains homogeneity in the melted material and eliminates the possibility of entrapped air or gas becoming mixed with the melted material which could cause burning or discoloration of the plastic material during injection. The feed plunger 62 may be propelled forwardly a full stroke, a portion of a stroke or may be reciprocated a plurality of times depending on the quantity of premelted material desired in the cylinder 40 which depends on the size of the article being molded.

When the material premelting section 33 is forced back by the plastic material being fed into the injection cylinder 40 and assumes a position which can be predetermined either by a pre-set limit switch position or by preadjusted mechanical stops thereby measuring the exact amount of material that can be injected per machine cycle, the feed plunger 62 is also stopped and oil is trapped in the cylinder 30 between the piston 60 and the cylinder head 24. The feeding or stuffing action just described is done while the previously molded article is still in the mold with a plastic sprue in the sprue opening 17 thus preventing the material being fed into the injection cylinder from being forced through the nozzle orifice prior to injection of the next article.

After the desired amount of melted material has been fed into the injection cylinder, the molded article is removed from the mold, and the mold is again closed for the next injection operation. Oil under pressure is then admitted to the cylinders 34 in front of the pistons 59 therein causing the cylinders, the chamber 38 and the feed plunger 62 (movable units numbered 20 to 49 and 60 to 69) to move forward to the position of Fig. 5, thereby forcing the melted plastic material in the injection cylinder through the nozzle extensions 50 and 54 and through the nozzle orifice into the mold. Both the speed and the pressure of this injection action are adjustable in accordance with the usual practice. After the injection operation is complete, as in Fig. 5, the material feeding part of the cycle is again started and the molding cycle repeated.

Nozzle seal

During normal operations, the nozzle 56 is sealed in relation to the sprue opening 17 of the mold by force exerted by the two hydraulic lock pistons 70 operating in their cyliders 19 by oil under pressure being introduced on the piston rod sides of the pistons.

Retraction of injection unit

To gain access to the rear of the sprue opening 17, the entire injection and feed assembly (parts 20—49, 50—59 and 60—69) can be retracted. For example, if a sprue (tapered piece of plastic material which is attached to the molded article or its runner) would become stuck in the sprue opening, the molder normally has to retract the nozzle away from the sprue opening and actually retract the injection unit far enough the permit using a brass rod to tap the tapered stuck sprue from the sprue opening and this operation is facilitated with our construction and the positioning of the parts described as follows: Piston rods 72 are advanced (dotted position in Fig. 5) thereby permitting manual removal of the U-bars 76. Oil under pressure is then introduced into the cylinders 18 is front of the pistons 21. This retracts the entire injection and feed assembly to any position within the limits of travel of the piston 21 in the cylinder 18. The maximum limit is indicated by the dimension B in Fig. 8. To return the entire injection and feed assembly to normal molding position, oil under pressure is introduced into the pullback area of the cylinder 18 in back of the piston 21. This will advance the entire injection and feed assembly to the nozzle sealing position so that the U-bars 76 can be replaced and the piston rods 72 can then be retracted, thus sealing the nozzle 56 to the sprue opening 17.

Separating operation (Fig. 7)

To separate the injection cylinder 40 and the chamber 38 from the plunger 50 for cleaning and inspection purposes, oil under pressure is introduced into the cylinder 18 in front of the piston 21. The oil in front of the pistons 59 in the cylinders 34 is free to return to the oil tank 47a. This action drives the cylinders 34 and their associated parts 20 to 49 and 60 to 69 rearwardly from the Fig. 6 position to the Fig. 7 position. It will be noted that the injection cylinder 40 is now pulled off the injection plunger 50 so that space indicated by the dimension A is provided to clean and inspect both the exit end of the cylinder 40 and the entrance end of the plunger 50. In this position the cylinder 40 can be cleaned or inspected and if desired, plastic material can be forced from the chamber 38 by actuating the feed ram 60. To again advance the injection cylinder 40 over the plunger 50, oil under pressure is introduced into the cylinders 34 in front of the pistons 59. During this action, oil in the cylinder 18 in front of the piston 21 is free to flow back to the oil tank.

Purging operation (Fig. 8)

For purging the injection unit when changing colors or molding materials, the piston rods 72 are advanced (dotted position of Fig. 5) thereby permitting manual removal of the U-bars 76. Oil under pressure is introduced into the cylinder 18 in front of the piston 21. This retracts entire injection and feed assemblies 20 to 49, 50 to 59 and 60 to 69 to the Fig. 8 position. When the piston 21 has reached its retracted position, oil under pressure is introduced into the cylinders 34 in front of the pistons 59 if the parts were in the position of Fig. 6 to start with. This retracts the head 52 and thereby the plunger 50 to the maximum "in" position in the injection cylinder 40 as shown in Fig. 8 as represented by dimension B. If the parts were in the position of Fig. 5 to start with, the introduction of oil under pressure to the cylinders 34 is not necessary.

In the Fig. 8 position, plastic material is fed into the feed sleeve 43 and forward motion of the feed plunger 62 actuated by the piston 60 will permit the plastic material to be moved through the heating section 33 and expelled into the atmosphere, thereby purging the chamber 38 with a minimum amount of material being wasted. Since the two pistons 59 exert a force greater than the piston 60, there is no possible chance of the plunger 50 separating from the injection cylinder 40 during the purging of the heating chamber. After the purging operation is completed, the injection unit can be returned to the normal molding position of Fig. 5 by introducing oil under pressure into the pullback area of the cylinder 18 in back of the piston 21 in the same manner as described in "Retraction of injection unit."

Some changes may be made in the construction and arrangement of the parts of our molding machine without departing from the real spirit and purpose of our invention, and it is our intention to cover by our claims any modified forms of structure or use of mechanical equivalents which may reasonably be included within their scope.

We claim as our invention:

1. A molding machine comprising a frame, a mold carried thereby, first, second and third movable units on said frame, said first movable unit forming with said second movable unit cylinder and plunger injection means and hydraulically operable cylinder and piston injection operation means, said last means including a pressure relief valve to offer hydraulic resistance to relative movement of the cylinder and piston thereof, said second movable unit having a nozzle communicating with said injection means to supply molding material to the mold, said third movable unit forming with said first movable unit cylinder and plunger feed means and hydraulically operable cylinder and piston feed operation means, said third movable unit upon movement thereof relative to said first movable unit effecting such relative movement of the cylinder and piston of said feed operation means against the hydraulic resistance offered by said relief valve, said first movable unit having between said injection means and said feed means a premelting chamber for molding material fed by said feed means to said injection means.

2. A molding machine comprising a frame for supporting a mold, first, second and third units on said frame, said first unit forming with said second unit cylinder and plunger injection means, and hydraulically operable cylinder and piston injection operation means, said last means including a pressure relief valve to offer hydraulic pressure to relative movement of the cylinder and piston thereof, said second unit being movable relative to said frame and having a nozzle communicating with said injection means to supply molding material to the mold, said third unit being movable relative to said frame and forming with said first unit cylinder and plunger feed means, hydraulically operable cylinder and piston feed operation means, said third unit upon movement thereof relative to said first unit effecting such relative movement of the cylinder and piston of said feed operation means against the hydraulic pressure resistance offered by said relief valve, said chamber of said first unit having between its said ends a premelting chamber for molding material, said feed plunger closing said feed cylinder during the injection operation, and said feed plunger during operation propelling said first unit rearwardly.

3. A molding machine comprising a frame for supporting a mold, first, second and third units on said frame, said first unit being movable relative to said frame and forming with said second unit cylinder and plunger injection means and cylinder and piston injection operation means, said second unit having a nozzle communicating with said injection means to supply molding material to the mold, said third unit being movable relative to said frame and forming with said first unit cylinder and plunger feed means and cylinder and piston feed operation means, said third unit upon movement thereof relative to said first unit effecting such relative movement of the cylinder and piston of said feed operation means, said first unit having between said injection means and said feed means a premelting chamber, said first unit being additionally movable relative to said frame to disassociate the cylinder and plunger of said injection means for cleaning and inspecting purposes, and additional cylinder and piston means to effect such disassociation, said cylinder and piston injection operation means being operable to reassociate the cylinder and plunger of said injection means.

4. In a molding machine, a frame for supporting a mold, first, second and third units on said frame, said first unit being movable relative to said frame and forming with said second unit cylinder and plunger injection means, and hydraulically operable cylinder and piston injection operation means, said last means including a pressure relief valve to offer hydraulic resistance to relative movement of the cylinder and piston thereof, said second unit having a nozzle communicating with said injection means to supply molding material to the mold, said third unit being movable relative to said frame and forming with said first unit cylinder and plunger feed means, and hydraulically operable cylinder and piston feed operation means, said third unit upon movement thereof relative to said first unit effecting such relative movement of the cylinder and piston of said feed operation means against the hydraulic pressure resistance offered by said relief valve, means for premelting molding material fed by said feed means to said injection means, said first unit being additionally movable relative to said frame to disassociate the cylinder and plunger of said injection means for cleaning and inspecting purposes.

5. In a molding machine, a frame for supporting a mold, first, second and third movable units on said frame, said first movable unit forming with said second movable unit cylinder and plunger injection means, and cylinder and piston injection operation means, said second movable unit having a nozzle communicating with said injection means to supply molding material to the mold, hydraulic lock means to retain the nozzle connected with the mold during injection operations, said third movable unit forming with said first movable unit cylinder and plunger feed means and cylinder and piston feed operation means, said third movable unit upon movement thereof relative to said first movable unit effecting such relative movement of the cylinder and piston of said feed operation means, said first movable unit having between said injection means and said feed means a premelting chamber for the molding material, said hydraulic lock means being releasable to permit disassociation of said nozzle relative to the mold and comprising cylinder and piston means and a headed stem, said second movable unit having an opening to receive said headed stem, and a retainer adapted to be placed between the head of said headed stem and said second movable unit to operatively connect the two together during injection operations.

6. A molding machine comprising a frame for supporting a mold, first, second and third movable units on said frame, said first movable unit forming with said second movable unit cylinder and plunger injection means, and cylinder and piston injection operation means, said last means including a pressure relief valve to offer resistance to relative movement of the cylinder and piston thereof, said second movable unit having a nozzle communicating with said injection means to supply molding material to the mold, hydraulic lock means to retain the nozzle connected with the mold during injection operations, said third movable unit forming with said first movable unit cylinder and plunger feed means, and cylinder and piston feed operation means, said third movable unit upon movement thereof relative to said first movable unit effecting such relative movement of the cylinder and piston of said feed operation means against the resistance offered by said relief valve, said first movable unit having between said injection means and said feed means a premelting chamber for molding material fed by said feed means to said injection means, said hydraulic lock means being releasable to permit disassociation of said nozzle relative to the mold, and additional cylinder and piston means for moving all three of said movable units in a direction for separating said nozzle from the mold for purging purposes.

7. A molding machine of the character disclosed comprising a frame for supporting a mold, first, second and third movable units on said frame, said first movable unit forming with said second movable unit an injection means and an injection operation means, said second movable unit having a nozzle communicating with said injection means to supply molding material to the mold, positive lock means to retain the nozzle connected with the mold during injection operations, said third movable unit forming with said first movable unit a feed means and a feed operation means, said third movable unit upon movement thereof relative to said first movable unit effecting operation of said feed operation means, said first movable unit having between said injection means and said feed means a premelting chamber for the molding material, said positive lock means being releasable to permit disassociation of said nozzle relative to the mold, and additional means for moving all three of said movable units in a direction for separating said nozzle from the mold for purging purposes after said lock means is released.

8. An injection molding machine comprising a frame, a first unit slidably mounted thereon, a feeding, premelting and injection chamber carried by said first unit, a second unit on said frame and having a nozzle provided with a nozzle extension entering the injection end of said chamber, a third unit movably carried by said first unit and having a feed plunger entering the feeding end of said chamber, means of hydraulic coaction between said first and second units for telescoping said injection chamber over said nozzle extension for the injection operation, another means of hydraulic coaction between said first and third units to effect reciprocation of said feed plunger relative to the feeding end of said chamber and thereby movement of said first unit relative to said second unit to receive the material being fed by said feed plunger and the feeding end of said chamber in the injection end thereof, said premelting portion of said chamber being located intermediate said feeding end of said chamber and the injection end thereof.

9. In an injection molding machine, a frame, a first unit slidably mounted thereon, a feeding, premelting and injection chamber carried by said first unit, a second unit on said frame and having a nozzle provided with a nozzle extension telescopically entering the injection end of said chamber, a third unit movably carried by said first unit and having a feed plunger entering the feeding end of said chamber, means of hydraulic coaction between said first and second units for telescoping said injection chamber over said nozzle extension for the injection operation, another means of hydraulic coaction between said first and third units to effect reciprocation of said feed plunger relative to the feeding end of said chamber and thereby movement of said first unit relative to said second unit to receive the material being fed by said feed plunger and the feeding end of said chamber in the injection end thereof, and means for causing additional movement of said injection end of said chamber so that it telescopes off said nozzle extension for cleaning and inspecting purposes.

10. An injection molding machine comprising a frame for supporting a mold, a first unit slidably mounted thereon, a feeding, premelting and injection chamber carried by said first unit, a second unit on said frame and having a nozzle for supplying material to the mold, said nozzle being provided with a nozzle extension entering the injection end of said chamber, a third unit movably carried by said first unit and having a feed plunger entering the feeding end of said chamber, means of hydraulic coaction between said first and second units for telescoping said injection chamber over said nozzle extension for the injection operation, another means of hydraulic coaction between said first and third units to effect reciprocation of said feed plunger relative to the feeding end of said chamber for a feeding operation of material to the injection end of said chamber, and means for causing movement of said first, second and third units to retract said nozzle from the mold for purging purposes.

References Cited in the file of this patent

UNITED STATES PATENTS

| | | |
|---|---|---|
| 2,273,713 | Lawyer | Feb. 17, 1942 |
| 2,479,433 | Tucker | Aug. 16, 1949 |
| 2,804,649 | Hupfield | Sept. 3, 1957 |

FOREIGN PATENTS

| | | |
|---|---|---|
| 1,110,829 | France | Oct. 19, 1955 |
| 635,991 | Great Britain | Apr. 19, 1950 |